(12) United States Patent
Petricio Yaksic

(10) Patent No.: US 9,481,024 B1
(45) Date of Patent: Nov. 1, 2016

(54) PIPE JOINING

(71) Applicant: Davor Petricio Yaksic, Antofagasta (CL)

(72) Inventor: Davor Petricio Yaksic, Antofagasta (CL)

( * ) Notice: Subject to any disclaimer, the term of this patent is extended or adjusted under 35 U.S.C. 154(b) by 163 days.

(21) Appl. No.: 14/222,208

(22) Filed: Mar. 21, 2014

Related U.S. Application Data

(60) Provisional application No. 61/803,991, filed on Mar. 21, 2013.

(51) Int. Cl.
| | |
|---|---|
| *B21B 21/00* | (2006.01) |
| *B21D 39/04* | (2006.01) |
| *B21B 17/14* | (2006.01) |
| *F16L 13/14* | (2006.01) |
| *F16L 13/16* | (2006.01) |
| *B21B 31/02* | (2006.01) |

(52) U.S. Cl.
CPC .............. *B21D 39/04* (2013.01); *B21B 17/14* (2013.01); *B21B 21/00* (2013.01); *B21B 21/005* (2013.01); *B21B 2031/025* (2013.01); *F16L 13/141* (2013.01); *F16L 13/161* (2013.01); *Y10T 29/49908* (2015.01); *Y10T 29/49913* (2015.01); *Y10T 29/49917* (2015.01); *Y10T 29/49918* (2015.01)

(58) Field of Classification Search
CPC ....... B21C 37/12; B21B 13/08; B21B 13/10; B21B 15/0085; B21B 17/06; B21B 17/12; B21B 17/14; B21B 21/00; B21B 21/005; B21B 21/02; B21B 21/045; B21B 21/065; B21B 23/00; B21B 2031/025; B21D 31/005; B21D 39/04; B21D 39/046; B21D 39/048; B21D 41/04; B29C 65/567; B29C 65/568; B29C 66/522; B29C 66/5221; F16L 13/14; F16L 13/141; F16L 13/142; F16L 13/143; F16L 13/161; F16L 2013/145; Y10T 29/49908; Y10T 29/49909; Y10T 29/49913; Y10T 29/49917; Y10T 29/49918; Y10T 29/49924; Y10T 29/49925; Y10T 29/49927
USPC ........... 72/49, 214, 220, 224, 237, 240, 245, 72/249, 252.5, 365.2, 366.2, 370.1, 72/370.13, 383, 399, 402; 29/450, 505, 29/506, 508, 510, 511, 514, 515, 516
See application file for complete search history.

(56) References Cited

U.S. PATENT DOCUMENTS

| | | | | |
|---|---|---|---|---|
| 3,572,078 A | * | 3/1971 | Kennedy | ................. B21C 37/18 72/194 |
| 3,600,913 A | * | 8/1971 | Dorp | .................... B21B 21/005 72/208 |
| 4,418,458 A | | 12/1983 | Hunter | |

(Continued)

FOREIGN PATENT DOCUMENTS

| | | |
|---|---|---|
| EP | 2019243 A1 | 1/2009 |
| WO | 2011137924 A1 | 11/2011 |

*Primary Examiner* — Peter DungBa Vo
*Assistant Examiner* — Joshua D Anderson
(74) *Attorney, Agent, or Firm* — James Creighton Wray; Meera P. Narasimhan

(57) ABSTRACT

Pipe joining compresses sleeves on abutted pipe ends. The sleeves are deformed beyond elastic limits, and the pipe ends are moved inward and exert outward forces on the sleeves. A machine has racks and an assembly of radial geared rollers which turn and compress the sleeves with grooves surfaces. Assemblies of fixed racks and assemblies of rollers on axles relatively move by hydraulic power, causing the rollers to turn and compress the sleeves.

20 Claims, 11 Drawing Sheets

(56) References Cited

U.S. PATENT DOCUMENTS

| | | |
|---|---|---|
| 4,418,948 A | 12/1983 | Lew |
| 4,541,655 A | 9/1985 | Hunter |
| 4,541,659 A | 9/1985 | Nakamura |
| 4,598,938 A | 7/1986 | Boss |
| 5,277,457 A | 1/1994 | Hayashi |
| 5,322,331 A | 6/1994 | McClellan |
| 5,351,515 A * | 10/1994 | Astley .................. B21B 21/045 72/126 |
| 5,442,846 A | 8/1995 | Snaper |
| 5,502,865 A | 4/1996 | Buchanan |
| 6,049,962 A | 4/2000 | Pfeiffer |
| 6,131,964 A | 10/2000 | Sareshwala |
| 6,581,982 B1 | 6/2003 | Nghiem |
| 6,595,559 B1 | 7/2003 | Readman |
| 6,619,701 B1 | 9/2003 | Udhofer |
| 6,843,514 B2 | 1/2005 | Rex |
| 7,197,906 B2 | 4/2007 | Tsuyuguchi |
| 7,596,848 B2 * | 10/2009 | Urech .................. B21C 37/154 29/508 |
| 7,690,237 B2 | 4/2010 | Slack |
| 8,117,724 B2 | 2/2012 | Volta |
| 2012/0079864 A1 * | 4/2012 | Kim ..................... G21C 21/00 72/208 |
| 2013/0174628 A1 * | 7/2013 | Thurner .................. B21H 1/20 72/206 |

\* cited by examiner

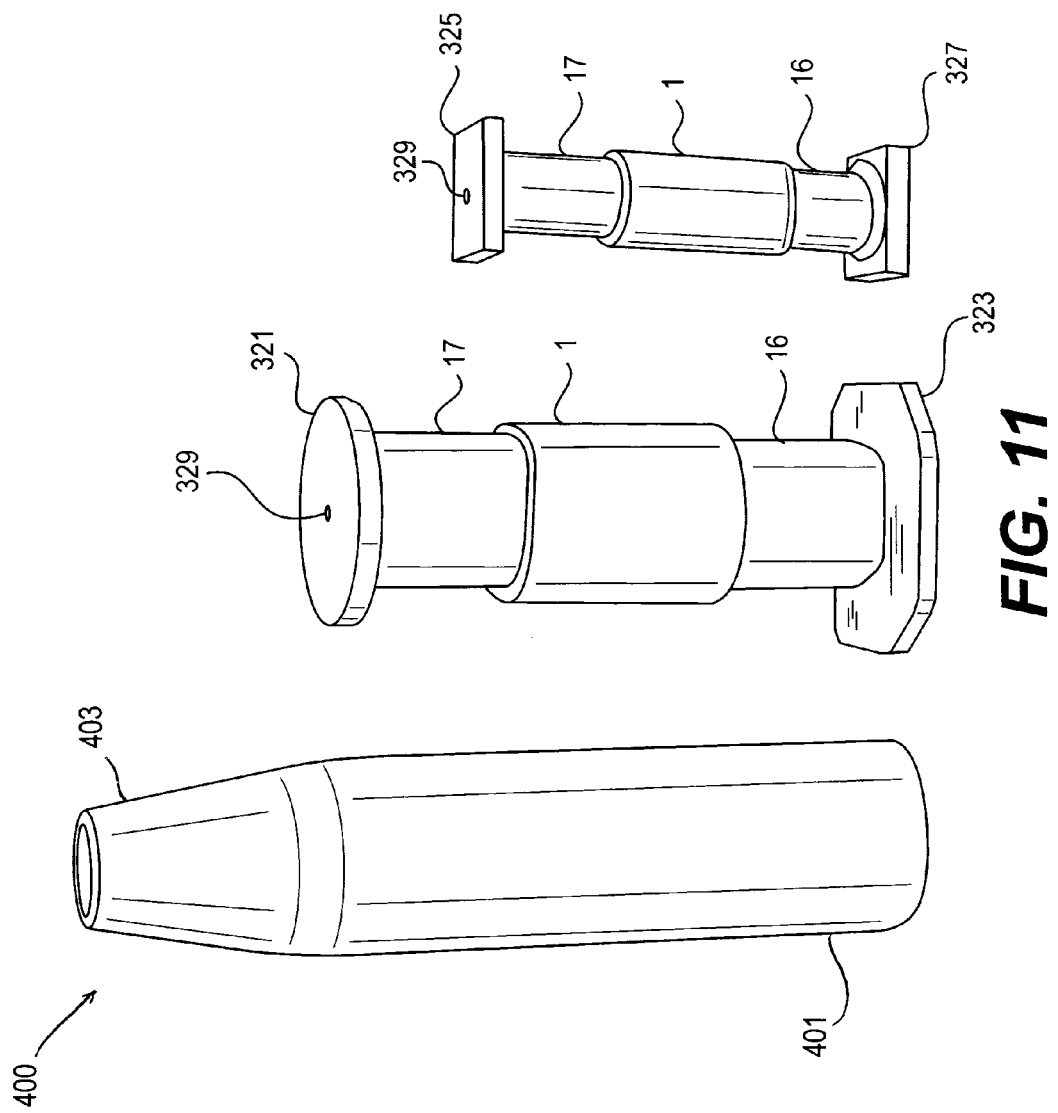

PIPE JOINING

This application claims the benefit of U.S. Provisional Application No. 61/803,991 filed Mar. 21, 2013, which is hereby incorporated by reference in its entirety as if fully set forth herein.

SUMMARY OF THE INVENTION

Pipes are joined by placing a sleeve on a first pipe and extending half of the sleeve beyond an end of the first pipe. Then an end of a second pipe is placed in the sleeve, and the pipe ends are abutted. A pipe joining machine is placed on one of the two pipes before or after the two pipes are assembled. When the joining machine has a hinge and a latch, the joining machine is opened, placed on one of the two pipes near the sleeve and closed and latched. When the joining machine has no separation, the joining machine is placed on the first pipe before the sleeve is added. Alternatively, the joining machine is placed on the second pipe before its end is inserted in the sleeve.

The joining machine has first and second cylindrical frames. The first inner frame and the second outer frame relatively move as the sleeve is compressed on the pipe ends. The first frame has spaced first and second end plates joined by rack bars. The second frame has axles on which roller gears are mounted. The gears mesh with the racks on the rack bars. The rollers have concave surfaces for engaging the sleeve. Double acting hydraulic pistons push the first frame axially with respect to the second frame. The axial movement of the second frame drives the racks that turn the gears. The gears cause the rollers to roll and compress the sleeve.

Compression of the sleeve compresses the pipe ends within the sleeve. The sleeve and the pipe ends are compressed beyond their elastic limits and remain distorted. The pipe ends are held in compression and push outward on the sleeve. The sleeve is in tension and pushes inward on the pipe ends. The tension of the thick sleeve withstands the outward force of the distorted pipes as well as the forces caused by high pressures within the pipes.

After joining the pipes with the sleeve, the joining machine may be unlatched and hinged open to allow removal of the joining machine from the joined pipes.

Alternatively, the joining machine may be slid along the pipes to the next joint.

An apparatus for joining pipes has a frame surrounding pipes to be joined. Racks are connected to the frame and rollers are rotatably mounted on a relatively movable part of the frame. Gear teeth on the rollers are in contact with the racks. Concave surfaces are connected to the rollers facing the pipes. A driver is connected to the frame for relatively moving part of the frame with respect to the pipes. The racks rotate the rollers with the gear teeth and move the concave surfaces toward the pipes. The driver moves a part of the frame along the pipes. The apparatus has a sleeve for placing on areas of the pipes to be joined. The concave surfaces contact the sleeve for compressing the sleeve on ends of the pipes to be joined.

In another embodiment, one of the pipes has a bell at one end, and the other pipe has a spigot. The spigot is inserted in the bell, and the concave surfaces on the rollers contact the bell for compressing the bell on the spigot as the driver relatively moves the frame with respect to the bell.

Plural rollers are rotatably mounted on the frame for moving the concave surfaces toward the pipes. The rollers have inward tapered side portions along radially outward portions of the rollers. The inward tapered portions of the rollers contact adjacent inward tapered portions of adjacent rollers near the pipes to form a complete circle.

The frame has spaced parallel annular end plates and elongated connectors mounted between the plates. The racks are mounted inward facing on the elongated connectors. A relatively movable annular roller mounting plate is positioned between the end plates. The driver has hydraulic cylinders and pistons mounted between the roller mounting plate and at least one of the end plates for relatively moving the roller mounting plate and the end plates.

A method of joining pipes includes providing a frame. The frame has spaced annular outer end plates on the frame. Connectors are provided between the outer end plates. The connectors have inward facing racks. A roller mounting plate is relatively movable with respect to the end plates. Rollers are mounted on the roller mounting plate. The rollers have gear teeth for engaging the racks. The rollers have concave contact surfaces opposite the gear teeth.

A driver relatively moves the roller mounting plate with respect to the end plates. Ends of the pipes to be joined are juxtaposed. The contact surfaces contact a sleeve on the juxtaposed pipe ends. The roller mounting plate is driven with respect to the end plates. The rollers are rotated with the gear teeth and the racks. The sleeve is compressed on the juxtaposed ends of the pipes to be joined by rolling the concave contact surfaces on the rollers along the sleeve, and thereby joining the pipes with the sleeve.

The sleeve is compressed inward beyond elastic limits of the sleeve, and the sleeve is permanently deformed inward. The juxtaposed ends of the pipes are compressed within elastic limits of the pipes. The ends of the pipes are resiliently pressed outward against the inward deformed sleeve after the joining of the pipe.

The roller mounting plate and the outer end plates are relatively moved hydraulically with cylinders and pistons mounted between at least one of the outer end plates and the roller mounting plate. The sleeve is compressed beyond its elastic limits, compressing the pipe ends, holding the pipe ends in compression with the sleeve and withstanding outward force of the compressed pipe ends with tension in the sleeve. The outer end plates and the roller mounting plate are in sections. The sections are unlatched. The pipe ends are surrounded and the sections are latched together before relatively driving the plates.

When the pipe is joined before laying in a ditch, the pipe may be moved through the machine. The annular roller mounting plate may be held stationary, and the assembly of the two outer plates, connectors and racks may be hydraulically moved. when the pipe is held stationary, the outer annular plate assembly may be held stationary and the annular roller mounting plate may be moved to rotate the rollers along the sleeve.

These and further and other objects and features of the invention are apparent in the disclosure, which includes the above and ongoing written specification, with the claims and the drawings.

BRIEF DESCRIPTION OF THE DRAWINGS

FIG. 11 shows pressure test pipes joined by sleeves.

DETAILED DESCRIPTION

Figure 1:
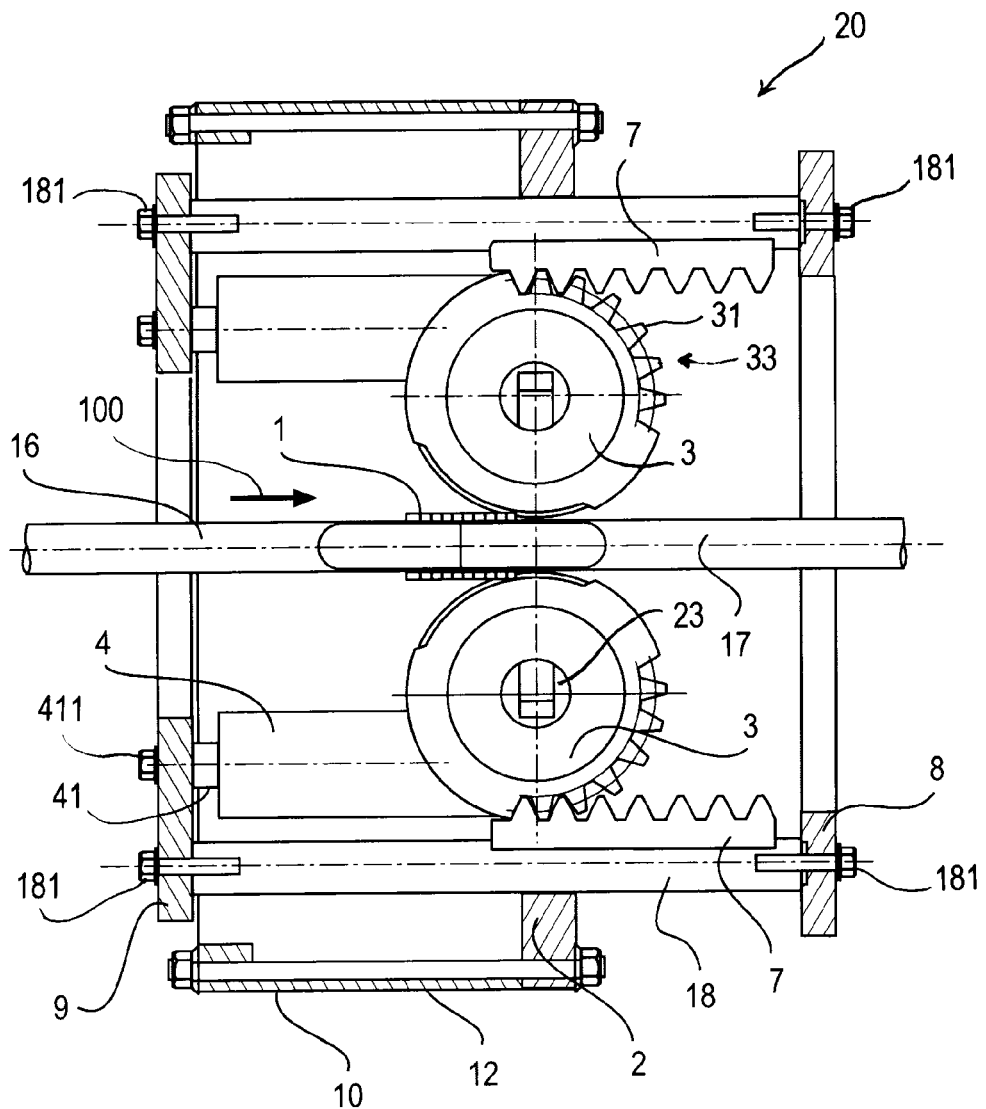
FIG. 1 is a cross-sectional elevation of the new joining machines, pipes with abutted ends and a sleeve. The arrow shows the impending motion of the joining machine with respect to the pipes and the sleeve.

FIG. 1 is a cross-sectional elevation of the new joining machines, pipes with abutted ends and a sleeve. The arrow shows the impending motion of the pipes and sleeve through the joining machine.

During the joint fabrication process the rollers are turned by rack bars and gears. The new rollers are also gears; the sides of the rollers in contact with the rack bar are the gears. Eight hydraulic cylinders 4 fixed to the circular frame 2 drive piston rods 41 to move frame 20 and to turn the eight rollers 3 by moving eight rack bars 18. The cylindrical frame 2 and 20 gives structural stability, making the eight rollers 3 rotate concurrently and equally.

FIG. 1 is a schematic view and a cross section of the device prepared for the first step to make a permanent joint between two pipes 16 and 17 using a sleeve 1.

End plates 8 and 9 of frame 20 are precisely spaced and held by rack bars 18 bolted 181 to the end plates. Bars 18 also serve as guides for circular frame 2. Axles 23 for rollers 3 are mounted on the circular plate 121 of cylindrical frame 2. Shell bolts 12 hold the cylindrical shell 10 on the circular plate 121 of the cylindrical frame 2.

Racks 7 on the rack bars 18 are engaged by the teeth 31 on gears 33 which are an integral part of the rollers 3. Double acting hydraulic cylinders 4 are connected to the heavy circular plate 121, on which the roller axles 23 are mounted. Piston rods 41 extending from the cylinders 4 are bolted 411 to the end plate 9 of frame 20.

It is important to understand which part of the machine is steady and which is moving. The steady part is formed by the circular frame 2, the eight axles 23, the eight rollers 3, the shell 10, the eight shell bolts 12 and the eight cylinders 4a. The mobile part is formed by the eight racks 7, the eight rack bars 18, the upper ring 8, the lower ring 9 and the eight piston rods 4b. That is especially true when the pipes 16 move through the machine. When the machine moves along the pipes, the eight racks are stationary, and the eight cylinders move the cylindrical frame 2.

The pistons 41 force the cylindrical frame and rack bars 18 to move with respect to frame 2. Rack bars 18 rotate the rollers 3 to compress the sleeve and abutting ends of pipes 16 and 17 to form the pipe joint. Arrow 100 shows the direction that the pipes and sleeve move with respect to the machine. When one of the pipes is fixed, as in a long pipeline, the machine moves with respect to the pipeline, sleeve and pipes being joined.

Figure 2:
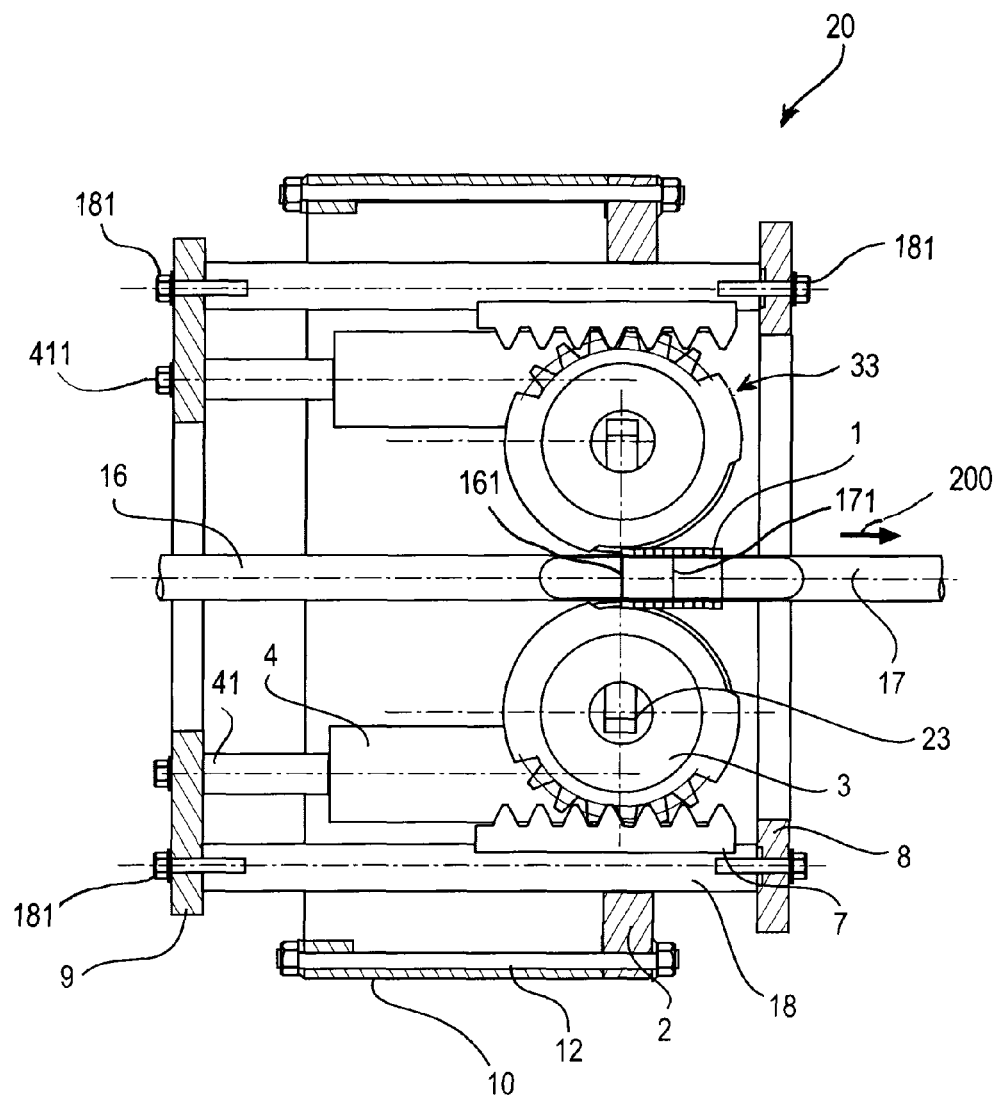
FIG. 2 is a cross-sectional elevation showing the new joining machine and the new pipe joint with the pipes having distorted ends and the sleeve compressed on the distorted ends of the pipes. The arrow shows the direction that the joining machine has moved with respect to the pipes.

FIG. 2 is a cross-sectional elevation showing the new joining machine and the new pipe joint with the pipes 16 and 17 having distorted ends 161 and 171 and the sleeve 1 compressed on the distorted ends of the pipes. The arrow 200 shows the direction that the pipes and sleeve 1 have moved with respect to the joining machine. FIG. 2 is a schematic view and a cross section of the device after finishing the permanent joint between the pipes.

The formed pipe joint with the compressed sleeve 1 and inner ends 161 and 171 of pipes 16 and 17 are shown. Metal in sleeve 1 has been compressed inward by the gear rollers 3, deforming sleeve 1 beyond its elastic limit and slightly decreasing the outer and inner diameters of the sleeve and increasing the thickness of the sleeve. Sleeve 1 tightly compresses and deforms inward the inner ends 161 and 171 of pipes 16 and 17. The result is that ends of pipes 16 and 17 are held in compression by the sleeve which resists the outward force of the pipe ends with tension forces in the sleeve. The result is a permanent and tight fluid pressure-containing joint.

Figure 3:
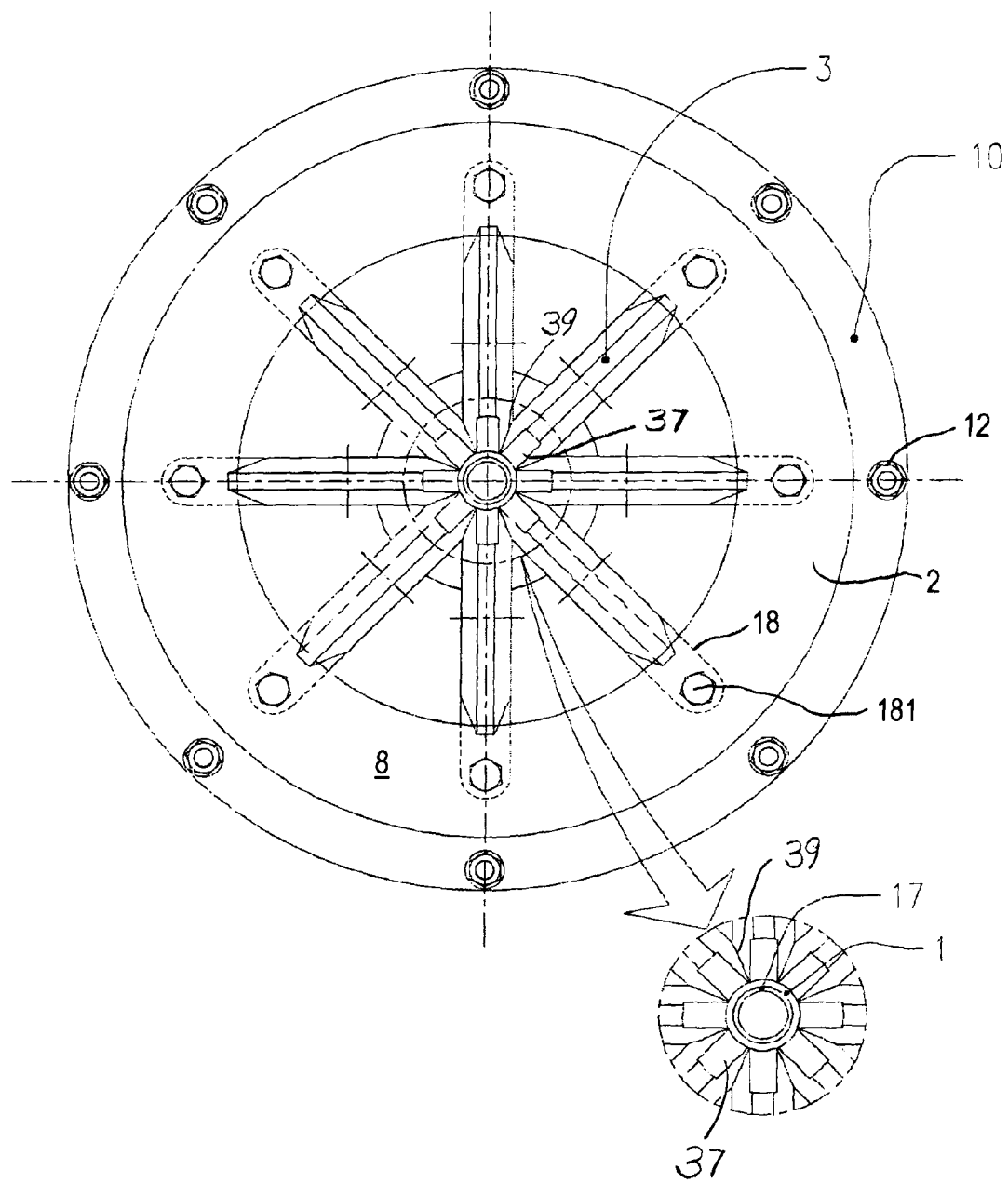
FIG. 3 is an end elevation of the frames, rollers and pipes.

FIG. 3 is an end elevation of the frames, rollers and pipes, showing an end view of the machine in the joint process.

The cylindrical shell 10 is connected by shell bolts 12 to the circular frame 2, shown in FIGS. 1 and 2. End plate 8 of the inner frame 20 shown in FIGS. 1 and 2 are connected to the opposite end plate 9 shown in FIGS. 1 and 2 by rack bars 18 held with bolts 181. Racks 7 on the rack bars 8 engage the teeth 31 on gears 33 shown in FIGS. 1 and 2. Geared rollers 3 turn on the axles 23 represented by the center lines shown in FIG. 3. The axles are supported in heavy circular plate 121 of outer cylindrical frame 2 shown in FIGS. 1 and 2.

As shown in FIG. 3, the rollers 3 have grooved faces 37 with a curvature of the curved outer surfaces of sleeves 1 after the compression. The sides 39 of the rollers 3 are tapered. The rollers' tapered sides engage and support each other as the groove faces compress the sleeve on pipes 16 and 17.

The described machine uses cylindrical rollers 3. This machine gave excellent results during the tests. When a pipe goes through the rollers, the pipe diminishes its radius uniformly. Putting a sleeve over a pipe union and making these three pieces go through the hole formed by the grooved faces 37 between the rollers, which are 5% smaller than the exterior diameter of the sleeve, results in a permanent joint. After this procedure the pipes are in compression and the sleeve is in tension. Both forces are equal. As the sleeve will also have to resist the pressure from a fluid, the sleeve should be about twice as thick as the pipes.

Tests were made with pipes of ½" Sch 40 and 2" Sch 80. The pipe union resisted internal pressures of 4000 lb/in$^2$. For each size of pipe a different set of rollers is needed. A set of rollers for 3" pipes produces joints with similar test results.

Figure 4:
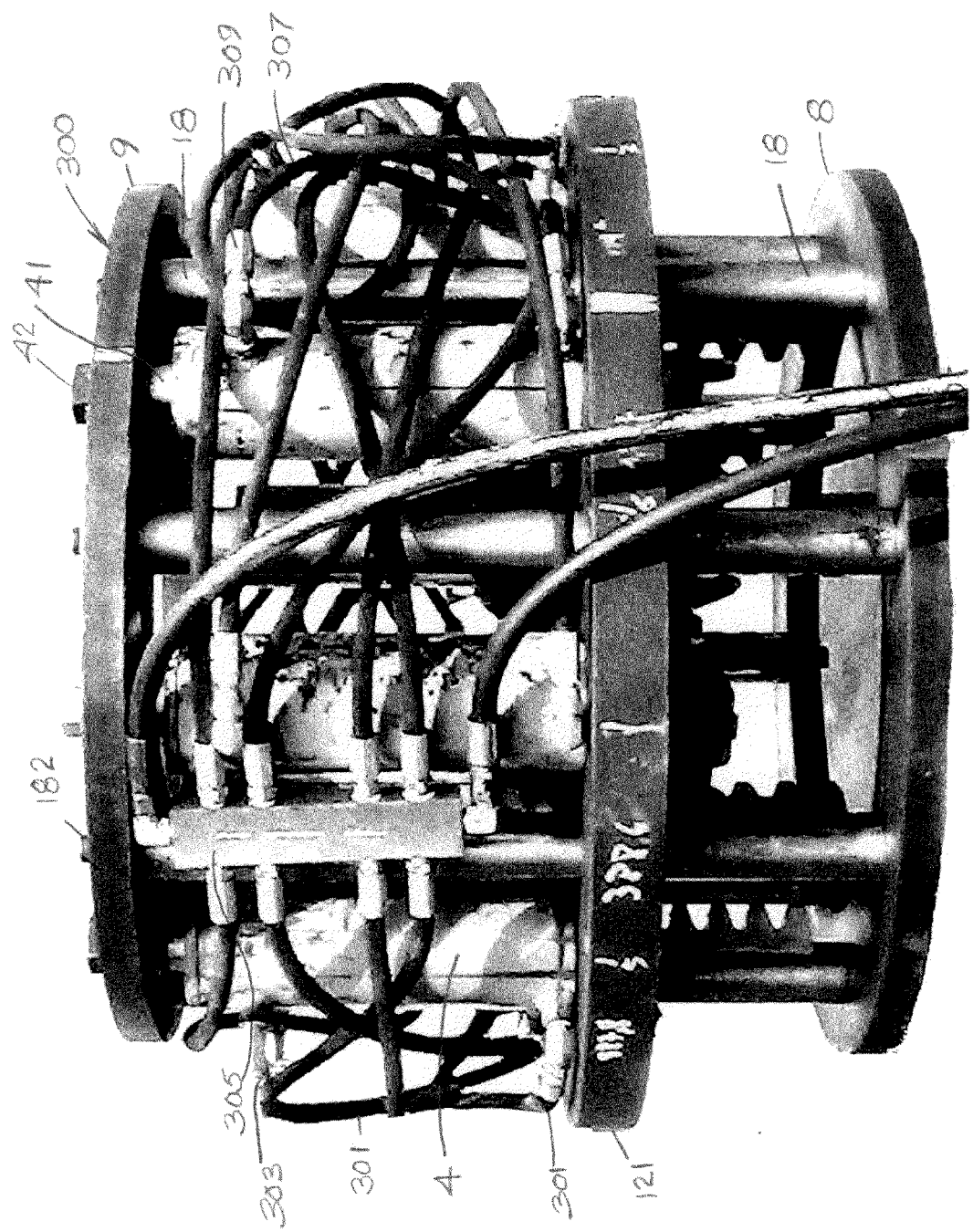
FIG. 4 is a side view of the machine and shows the frames, rack rods and guides double acting hydraulic cylinders, hydraulic pressure distributors and hoses.

FIG. 4 is a side view of the machine. The pipe joining machine 300 is shown on its side with plate 8 resting on blocks and plate 9 is at the top. Rack bars 18 extend between plates 8 and 9.

Eight cylinders 4 are mounted on heavy plate 121. Piston rods 41 are connected to plate 9. Hydraulic lines 301 and 303 are connected to ends of distributors 305 positioned on opposite sides of machine to supply hydraulic pressure to opposite ends of the double acting cylinders 4. Hydraulic hoses 307 are shown with terminal connectors 309 to piston rod ends of the cylinders 4.

Large bolts 42 connect ends of the shouldered piston rods to plate 9.

The connections of the piston rods 41 and rack bars 18 are alternated in a circle as shown by the small bolts 182 connected to ends of the rack bars and the large bolts 42 connected to ends of the piston rods. The rack bars 18 are positioned in outward radial grooves extending from the central opening of the heavy central plate 121. The rollers 3 mounted on axles 23 in the heavy central plate 12 rotate in the same radial grooves.

Figure 5:
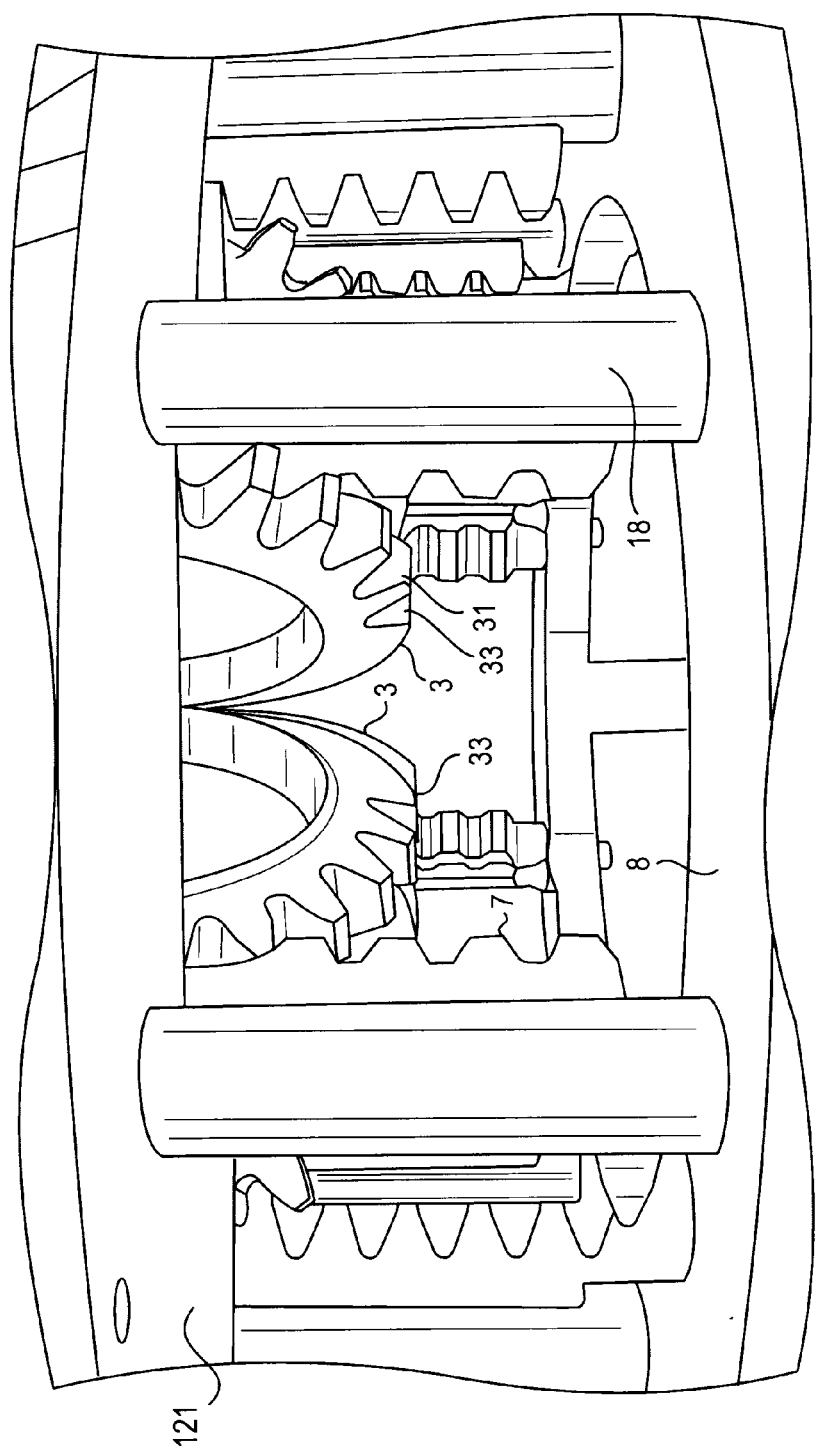
FIG. 5 is a detail of the rack rods and rolls with gears and shows the racks that drive the rolls.

FIG. 5 is a detail of the rack rods and rollers with gears and shows the racks that drive the rolls. Rollers 3 are shown extending from their axles in the grooves of the heavy central plate 2. Teeth 31 of the gears 33 cut from the rollers 3 engage the racks 7 on the rack bars 18. When hydraulic pressure is applied to the eight cylinders 4 plate 9 is pushed outward. Plate 9 pulls the rack bars 18, racks 7 and plate 8 and turns the gears 33 and the rollers 3.

Figure 6:
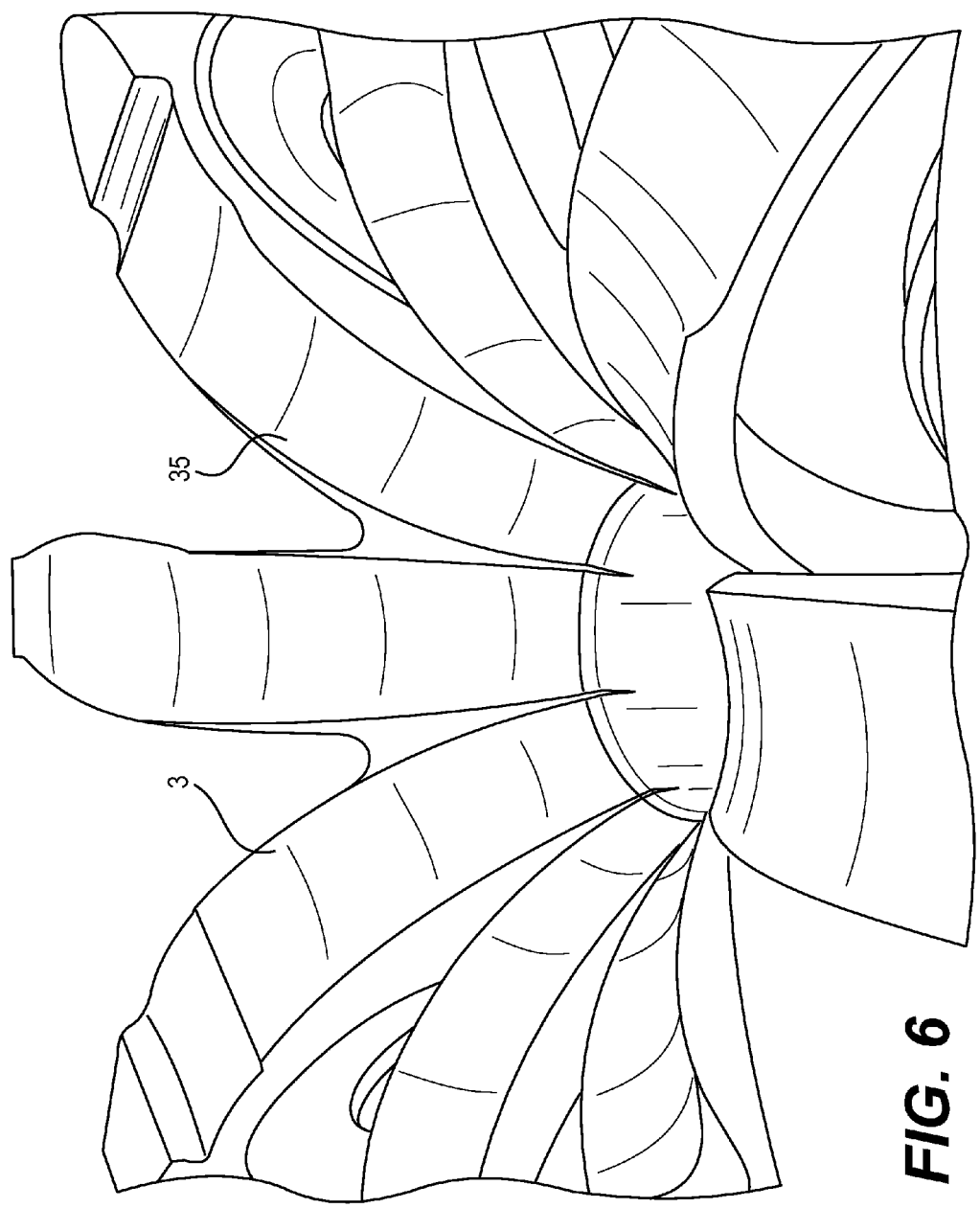
FIG. 6 shows the cooperation rollers.

FIG. 6 shows the cooperating rollers 3. As rollers 3 turn, the grooved faces 35 contact and compress the outer surface of sleeve 1 and compress the sleeve and the pipe ends. The sleeve and pipes relatively move with respect to the rollers 3 as the rollers turn. Alternatively, when one of the pipe ends is fixed, the heavy plate 121 and rollers 3 move with respect to the pipes 16 and 17 while sleeve 1 and the pipe ends are compressed.

Figure 7:
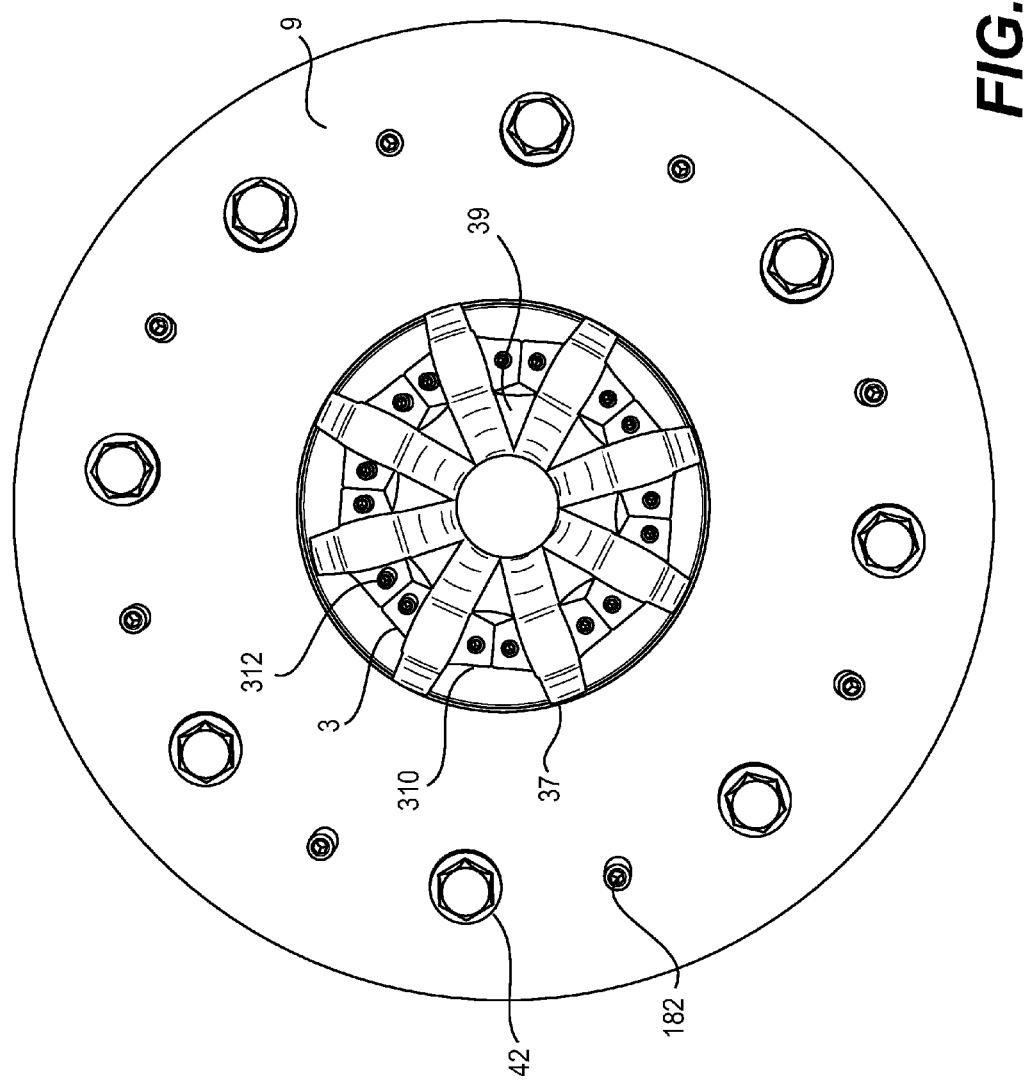
FIG. 7 is an end view showing an end plate, the rollers and guides.

FIG. 7 is an end view showing an end plate 9, the rollers 3 and guides 310. Plate 9 is shown with the large bolts 42 which anchor ends of the piston rods 41 and small bolts 182 which secure ends of the rack bars 18. Rollers 3, grooved compressing faces 37 and tapered sides 39 are shown. Guides 310 are fastened with bolts 312 to the heavy central plate to hold the roller axles 23 shown in FIGS. 1 and 2 and to provide lateral support to the rollers.

Figure 8:
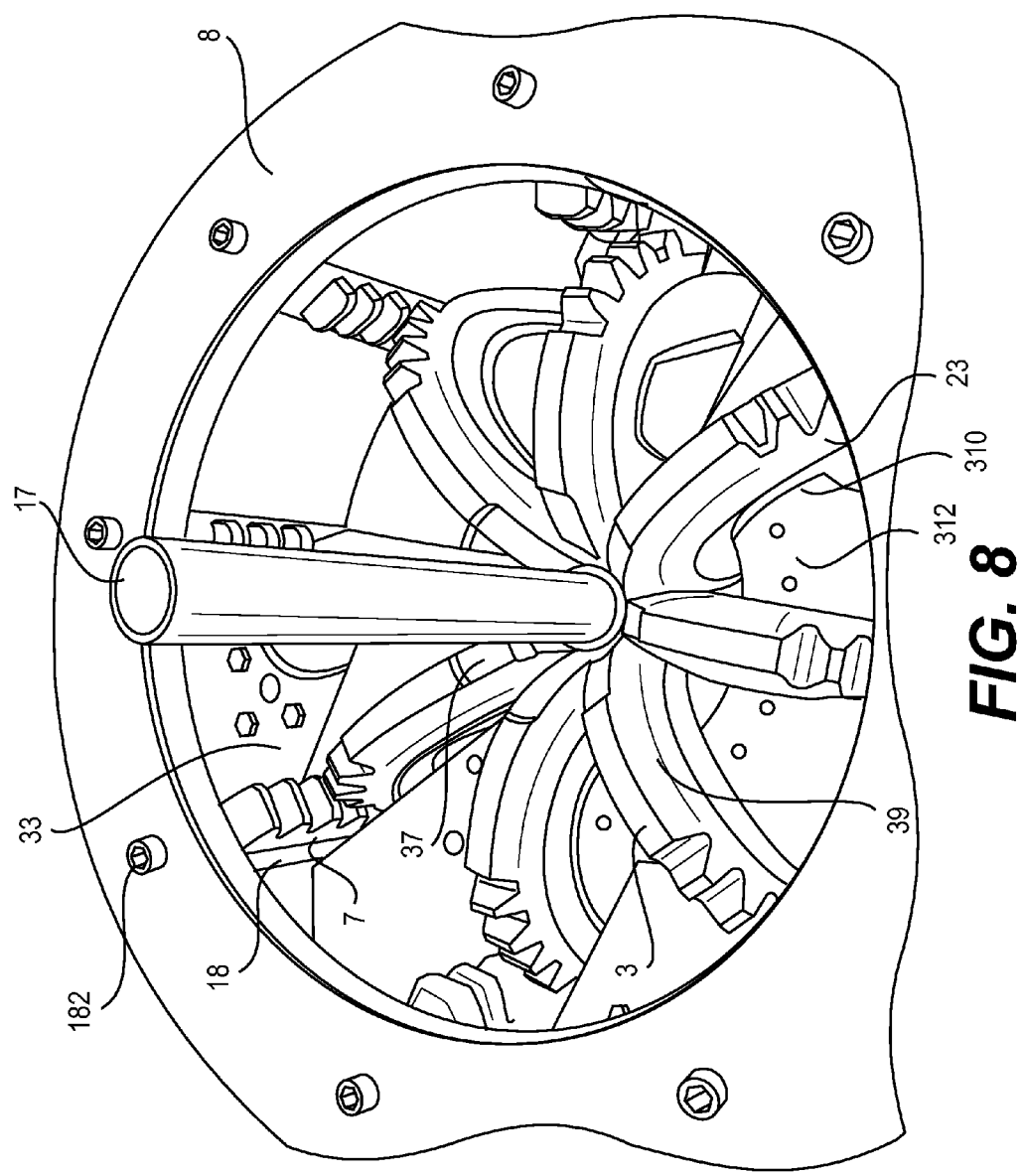
FIG. 8 shows an end plate, rack rods, gear rollers, guides a pipe and a sleeve being compressed on a pipe joint.

FIG. 8 shows an end plate, rack rods, gear rollers, guides a pipe and a sleeve being compressed on a pipe joint. Plate 9 is connected to the rack bars 18 by bolts 182. Racks 7 are shown with rollers 3 with gears 33 engaging racks 7. The grooved faces 37 and tapered sides 39 of the rollers are shown compressing sleeve 1 around the end of pipe 17. Ends of bolts 312 which hold the guides 310 and roller axles 23 are shown near the inner opening in heavy central plate 121

Figure 9:
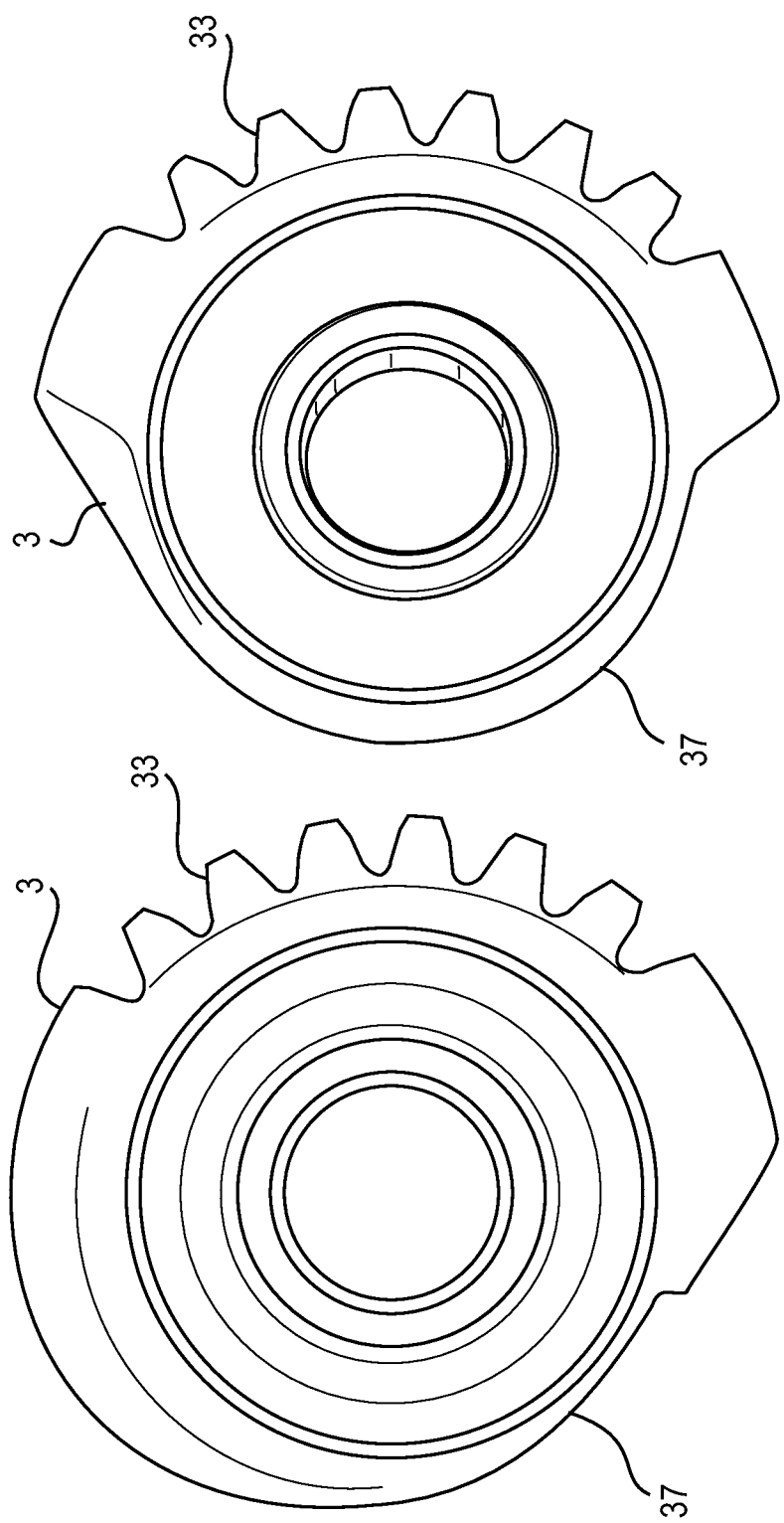
FIG. 9 shows a detail of the gear rollers.

FIG. 9 shows details of the gear rollers 3. Different sizes of the gear rollers 3 are shown. The rollers have the same size centers and gears 33 for the interchangeable use on machines 300. The roller on the left has a smaller radius to the compression face 37 radius and larger groove for compressing a larger sleeve on larger pipe ends. The roller on the right has a larger radius to the compression face 37 radius and smaller groove for compressing a smaller sleeve on smaller pipe ends. All tapered faces are radial to the pipes and sleeve.

Figure 10:
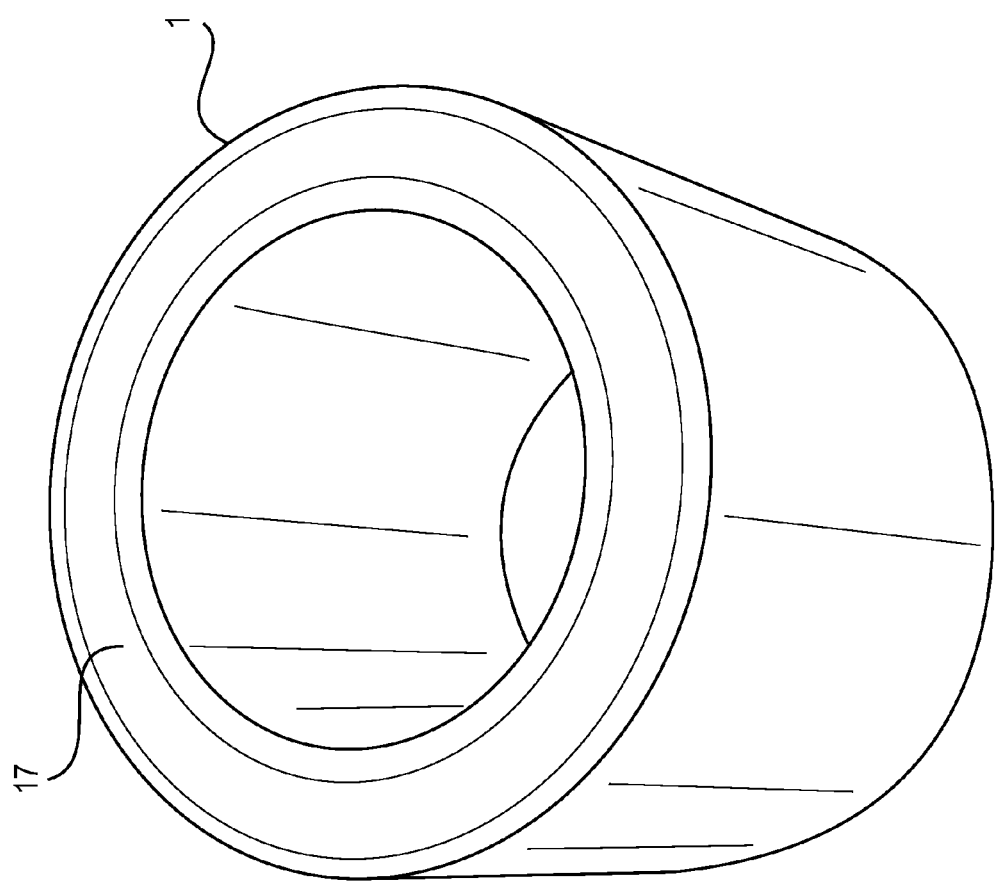
FIG. 10 shows a cross-section of a pipe and sleeve.

FIG. 10 shows a cross-section of a pipe 17 and sleeve 1. A pipe joint made according to the invention has been cut through a sleeve and one of the joined pipes. A tight joint is seen.

FIG. 11 shows pressure test pipes joined by sleeves. Pipes joined by sleeves according to the invention have welded end plates 321, 323, 325, 327 with central openings 329 in end plates 321 and 325 for pressure testing the pipes. Pipe 400 has a bell 401 at one end and a spigot 403 at another end. The spigot of another pipe is inserted in the bell and the concave surfaces on the rollers (FIGS. 1-4) contact the bell for compressing the bell on the spigot as the driver relatively moves the second part of the frame with respect to the bell.

The inner diameters of the pipes 16, 17 are reduced by about 1 mm. The joint withstands 4,000 pounds per square inch pressure without leakage. The joint withstood 10 tons of axial force attempting to axially separate the pipes.

One or more machine sizes may be constructed with interchangeable rollers which match the outer diameter. The pipe joining is conducted under high pressure. Molecules of pipes are found in the sleeve inner walls, and molecules of the sleeves are found in the pipe outer walls when the joint is cut and examined under a microscope. Tests have been conducted with compressed sleeve-joined ½, 1½, and 3 inch pipes. Larger 8, 12, 20 inch pipes with thicker walls require thicker sleeves and larger joining machines. A sleeve may be two times as thick as the pipes joined by the sleeve. In one example, ends of 1½" schedule 40 pipe are joined by a 2" schedule 80 sleeve. The joint was formed compressing the sleeve inward beyond its elastic limit and compressing both pipe ends inward. Both pipes and the sleeves deform. The inner diameters of the pipes are reduced by about 1 mm. The joint withstands 4,000 pounds per square inch pressure without leakage. The joint withstood 10 tons of axial force attempting to axially separate the pipes.

While the invention has been described with reference to specific embodiments, modifications and variations of the invention may be constructed without departing from the scope of the invention, which is defined in the following claims.

I claim:

1. Apparatus for joining pipes, comprising:
a frame surrounding pipes to be joined including a first cylindrical part and a second cylindrical part surrounding the first cylindrical part,
racks mounted on the first cylindrical part of the frame,
rollers rotatably mounted on the second cylindrical part of the frame,
the first cylindrical part and the second cylindrical part of the frame movable with respect to each other,
gear teeth formed on the rollers in contact with the racks,
concave surfaces on the rollers facing the pipes,
a driver connected to the frame relatively moving the first and second cylindrical parts of the frame, relatively moving the racks and rollers, rotating the rollers with the gear teeth in contact with the racks, and moving the concave surfaces toward the pipes for joining the pipes.

2. The apparatus of claim 1, wherein the driver moves the second cylindrical part of the frame along the pipes.

3. The apparatus of claim 1, further comprising a sleeve for placing on areas of the pipes to be joined.

4. The apparatus of claim 3, wherein the concave surfaces contact the sleeve for compressing the sleeve on ends of the pipes to be joined.

5. The apparatus of claim 1, wherein one of the pipes has a bell at one end, and the other of the pipes has a spigot at one end.

6. The apparatus of claim 5, wherein the spigot is inserted in the bell, and the concave surfaces on the rollers contact the bell for compressing the bell on the spigot as the driver relatively moves the second cylindrical part of the frame with respect to the bell.

7. The apparatus of claim 1, wherein the concave surfaces are on the rollers.

8. The apparatus of claim 1, wherein the rollers comprise plural rollers annularly mounted on the frame around the pipes for moving the concave surfaces toward the pipes.

9. The apparatus of claim 1, wherein the rollers have inward tapered lateral portions along radially outward portions of the rollers.

10. The apparatus of claim 9, wherein the inward tapered portions of the rollers contact adjacent inward tapered portions of adjacent rollers near the pipes.

11. The apparatus of claim 1, wherein the concave surfaces are concave toward the pipes.

12. The apparatus of claim 1, wherein the frame comprises spaced parallel annular end plates, elongated connectors mounted between the plates, and wherein the racks are mounted inward facing on the elongated connectors.

13. The apparatus of claim 12, wherein the frame further comprises an annular roller mounting plate between the end plates.

14. The apparatus of claim 13, wherein the driver further comprises hydraulic cylinders and pistons mounted between the roller mounting plate and at least one of the end plates for relatively moving the roller mounting plate and the end plates.

15. A method of joining pipes, comprising:
providing a frame surrounding pipes to be joined including a first cylindrical part and a second cylindrical part surrounding the first cylindrical part,
providing spaced annular outer end plates on the first cylindrical part of the frame,
providing connectors on the first cylindrical part between the outer end plates,
providing inward facing racks on the connectors,
providing a roller mounting plate mounted on the second cylindrical part of the frame relatively movable with respect to the end plates,
providing rollers mounted on the roller mounting plate,
providing gear teeth on the rollers for engaging the racks,
providing concave contact surfaces on the rollers opposite the gear teeth,
providing a driver for relatively moving the roller mounting plate and the second cylindrical part with respect to the end plates and the first cylindrical part,
juxtaposing ends of the pipes to be joined,
providing a sleeve on ends of the pipes to be joined,
contacting the sleeve with the concave contact surfaces on the rollers,
driving the roller mounting plate with respect to the end plates,
rotating the rollers with the gear teeth and the racks, and
compressing the sleeve on the juxtaposed ends of the pipes to be joined by rolling the concave contact surfaces on the rollers along the sleeve and towards the pipes, and thereby joining the pipes with the sleeve.

16. The method of claim 15, wherein the compressing comprises compressing the sleeve inward beyond elastic limits of the sleeve and permanently deforming the sleeve inward.

17. The method of claim 16, further comprising compressing the juxtaposed ends of the pipes to be joined within elastic limits of the pipes and resiliently pressing the ends of the pipes outward against the inward deformed sleeve after the joining of the pipe.

18. The method of claim 15, wherein the driving comprises relatively moving the roller mounting plate and the outer end plates hydraulically with cylinders and pistons mounted between at least one of the outer end plates and the roller mounting plate.

19. The method of claim 15, further comprising compressing the sleeve beyond its elastic limits and compressing the pipe ends, holding the pipe ends in compression with the sleeve and withstanding outward force of the compressed pipe ends with tension in the sleeve.

20. The method of claim 15, further comprising providing the outer end plates and the roller mounting plate in sections, unlatching the sections, surrounding the pipe ends and latching the sections together before relatively driving the plates.

\* \* \* \* \*